(12) United States Patent
Tagami et al.

(10) Patent No.: US 9,073,235 B2
(45) Date of Patent: Jul. 7, 2015

(54) METHOD FOR CUTTING WORKPIECE WITH WIRE SAW

(75) Inventors: Makoto Tagami, Hatsukaichi (JP); Hironori Kojima, Hikari (JP)

(73) Assignee: SILTRONIC AG, Munich (DE)

( * ) Notice: Subject to any disclaimer, the term of this patent is extended or adjusted under 35 U.S.C. 154(b) by 527 days.

(21) Appl. No.: 13/426,723

(22) Filed: Mar. 22, 2012

(65) Prior Publication Data

US 2012/0255535 A1 Oct. 11, 2012

(30) Foreign Application Priority Data

Apr. 5, 2011 (JP) ................................. 2011-083979

(51) Int. Cl.
*B28D 5/00* (2006.01)
*B28D 1/08* (2006.01)

(52) U.S. Cl.
CPC ...................................... *B28D 5/007* (2013.01)

(58) Field of Classification Search
CPC ......... B28D 5/045; B28D 5/007; B28D 1/025
USPC ............................. 125/21, 16.02, 12; 451/59
See application file for complete search history.

(56) References Cited

U.S. PATENT DOCUMENTS

| | | | | |
|---|---|---|---|---|
| 4,655,191 A * | 4/1987 | Wells et al. | ................. | 125/16.01 |
| 5,201,305 A * | 4/1993 | Takeuchi | ......................... | 125/21 |
| 5,269,285 A * | 12/1993 | Toyama et al. | ............ | 125/16.01 |
| 5,827,113 A * | 10/1998 | Okuno et al. | ................... | 451/36 |
| 6,390,896 B1 * | 5/2002 | Huber et al. | ..................... | 451/59 |
| 6,652,356 B1 * | 11/2003 | Ariga | ................................. | 451/7 |
| 6,773,333 B2 * | 8/2004 | Lundt et al. | ....................... | 451/7 |
| 6,832,606 B2 * | 12/2004 | Yamada et al. | ............. | 125/13.01 |
| 6,896,595 B2 * | 5/2005 | Kondo et al. | .................... | 451/49 |
| 7,793,647 B2 * | 9/2010 | Skovgaard-Soerensen | | 125/16.02 |
| 2003/0089362 A1 * | 5/2003 | Yamada et al. | ............ | 125/13.01 |

FOREIGN PATENT DOCUMENTS

| | | |
|---|---|---|
| CH | 696389 A5 | 5/2007 |
| CN | 101204836 A | 11/2007 |
| CN | 101791828 A | 8/2010 |
| EP | 1287958 A1 | 3/2003 |
| JP | 9085737 A | 3/1997 |
| JP | 9193142 A | 7/1997 |
| JP | 11099463 A | 4/1999 |
| JP | 2003080449 A | 3/2003 |
| JP | 3497784 B2 | 11/2003 |
| JP | 2007001442 A | 1/2007 |
| JP | 2008160124 A | 7/2008 |
| JP | 2010005773 A | 1/2010 |
| TW | I284073 B | 7/2007 |

* cited by examiner

*Primary Examiner* — Joseph J Hail
*Assistant Examiner* — Marc Carlson
(74) *Attorney, Agent, or Firm* — Leydig, Voit & Mayer, Ltd.

(57) ABSTRACT

A method for cutting a workpiece with a wire saw includes running at least one saw wire in a lateral direction. A first abrasive grain slurry is supplied to the saw wire on two points that are separated by a predetermined distance in a lateral direction. Cutting of the workpiece is started by moving at least one of the workpiece and the saw wire relative to the other and bringing the workpiece into contact with the saw wire from above at a location between the two points on the saw wire where the first abrasive grain slurry is supplied. A second abrasive grain slurry is supplied to a part of an area where the saw wire meshes with the workpiece.

8 Claims, 6 Drawing Sheets

METHOD FOR CUTTING WORKPIECE WITH WIRE SAW

CROSS REFERENCE TO RELATED APPLICATIONS

This application claims priority to Japanese Patent Application No. JP 2011-83979, filed Apr. 5, 2011, which is hereby incorporated by reference herein in its entirety.

FIELD

The present invention relates to a method for cutting a workpiece with a wire saw, in which a slurry containing abrasive grains (hereinafter called "abrasive grain slurry") is supplied to a saw wire and the workpiece then is cut, and, in particular, relates to a method for cutting a workpiece with a wire saw, in which a silicon ingot is cut as the workpiece.

BACKGROUND

Figure 8:
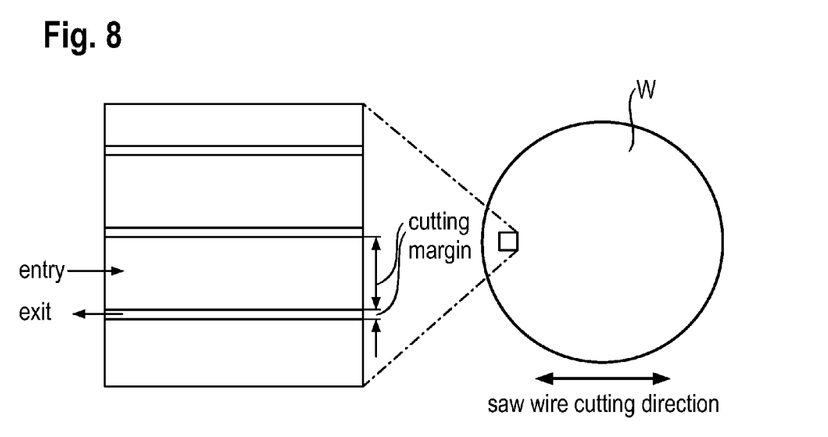
FIG. 8 is a drawing showing the appearance of the cut surface of the workpiece cut with a conventional method for cutting a workpiece.

Conventionally, when cutting hard and brittle workpieces such as silicon ingots, wire saws are used. As a method for cutting a workpiece with a wire saw, e.g., a method is disclosed wherein abrasive grain slurry is poured from nozzles arranged on both sides of the workpiece in lateral direction, onto a saw wire that is wound around a pair of wire guide rollers and moves left and right, while the workpiece is pushed against the saw wire and thus, the workpiece is cut [see, e.g., JP Patent Application Publication (Kokai) No. 7-1442 (hereinafter, JP '442")]. Furthermore, a method for cutting a workpiece with a saw wire is disclosed wherein in the process of cutting the workpiece with the saw wire, the workpiece is immersed into abrasive grain slurry in a tank so that the whole area where the workpiece meshes with the saw wire is immersed [see, e.g., JP Patent Application Publication (Kokai) No. 2008-160124 (hereinafter, "JP '124")]. Moreover, conventionally, a plurality of saw wires aligned in parallel are used to cut the In recent years, silicon ingots have become larger in diameter, so that precise cutting techniques for large-diameter silicon ingots are required. In the cutting method of JP '442, during the cutting run of the saw wire from the entry side to the exit side of the workpiece, i.e. in the meshing area of the saw wire, the abrasive grain slurry adhering to the saw wire and being supplied from nozzles is subject to attrition and separation and thus decreases. Therefore, in the case where a silicon ingot with a large diameter of 450 mm is cut, abrasive grain slurry sufficient for the cutting run of the saw wire from the entry side to the exit side of the workpiece cannot be provided only by supplying abrasive grain slurry to the saw wire from nozzles on both sides of the silicon ingot in lateral direction. Thus, decline, fluctuations, etc. in the cutting performance develop, and in the wafers formed by the cutting, undesired wafer properties such as undulation and bending occur, so that problems such as breakage of the saw wire emerge. As shown, e.g., in FIG. 8, in conventional cutting methods, the cutting margin (incision depth) of the saw wire on the exit side is much smaller than the cutting margin of the saw wire on the entry side. Incidentally, FIG. 8 is a drawing showing the enlarged cut surface of the left hand side part of the workpiece in the direction of the cutting run of the saw wire.

Furthermore, in the cutting method of JP '124, a surplus of abrasive grain slurry is supplied to the cutting part of the workpiece, the saw wire vibrates in the cutting groove, and the sliced part vibrates, so that the problem of wafers cracking occurs because neighboring wafers touch each other.

Thus, with conventional methods for cutting a workpiece with a wire saw it was impossible to cut silicon ingots with a large diameter of e.g. 450 mm without any problems.

Furthermore, since in the cutting method of JP '124 the whole area where the saw wire and the silicon ingot come into contact is immersed into an abrasive grain slurry liquid, particularly in the case of large diameter wafers, a surplus of abrasive grain slurry is supplied. Therefore, because the saw wire causes the slice parts to vibrate, or additionally because the abrasive grain slurry liquid inside the abrasive grain slurry bus is vibrated violently by the vibration due to the to-and-fro movement of the saw wire, the sliced parts vibrate under the influence of the vibration of the abrasive grain slurry liquid. Therefore, the quality of the cut surface regarding flatness, etc., decreases, and in some cases, problems such as the generation of cracks occur because neighboring sliced parts touch each other.

SUMMARY

In an embodiment, the present invention provides a method for cutting a workpiece with a wire saw including running at least one saw wire in a lateral direction. A first abrasive grain slurry is supplied to the saw wire on two points that are separated by a predetermined distance in a lateral direction. Cutting of the workpiece is started by moving at least one of the workpiece and the saw wire relative to the other and bringing the workpiece into contact with the saw wire from above at a location between the two points on the saw wire where the first abrasive grain slurry is supplied. A second abrasive grain slurry is supplied to a part of an area where the saw wire meshes with the workpiece.

BRIEF DESCRIPTION OF THE DRAWINGS

Exemplary embodiments of the present invention are described in more detail below with reference to the drawings, in which.

DETAILED DESCRIPTION

An aspect of the present invention is to provide a method for cutting a workpiece with a wire saw, which makes it possible to cut a large-diameter workpiece accurately and efficiently without any defects such as breakage occurring.

This can be achieved by a method for cutting a workpiece with a wire saw according to an embodiment of the present invention in which a workpiece is cut by running at least one saw wire in a lateral direction and bringing the workpiece into contact with the saw wire, and the method comprises the steps of supplying a first abrasive grain slurry to the saw wire on two points which are separated by a predetermined distance in the lateral direction, starting cutting of the workpiece by moving at least either one of the saw wire or the workpiece relative to the other and bringing the workpiece into contact with the saw wire from above at a location between the two points on the saw wire where the first abrasive grain slurry is supplied, and supplying a second abrasive grain slurry to a part of an area where the saw wire meshes with the workpiece.

In a method for cutting a workpiece with a wire saw according to an embodiment of the present invention, the supplying of the second abrasive grain slurry is performed by immersing the part of the area where the saw wire meshes with the workpiece into the second abrasive grain slurry.

In a method for cutting a workpiece with a wire saw according to an embodiment of the present invention, the second abrasive grain slurry is stored in a tank, and the part of the area where the saw wire meshes with the workpiece is immersed into an abrasive grain slurry surface of the second abrasive grain slurry stored in the tank.

In a method for cutting a workpiece with a wire saw according to an embodiment of the present invention, the two points on the saw wire where the first abrasive grain slurry is supplied are located above the abrasive grain slurry surface of the second abrasive grain slurry stored in the tank.

In a method for cutting a workpiece with a wire saw according to an embodiment of the present invention, the workpiece is cut by disposing a plurality of the saw wires in parallel with each other with a predetermined distance therebetween, running the plurality of saw wires in the lateral direction, and bringing the workpiece into contact with the plurality of saw wires.

In a method for cutting a workpiece with a wire saw according to an embodiment of the present invention, the first abrasive grain slurry is supplied from one supply source to one of the two points on the plurality of saw wires, and the first abrasive grain slurry is supplied from another supply source to the other of the two points on the plurality of saw wires.

In a method for cutting a workpiece with a wire saw according to an embodiment of the present invention, the first abrasive grain slurry is supplied from one supply source to one of the two points on each of the plurality of saw wires, and the first abrasive grain slurry is supplied from another supply source to the other of the two points on each of the plurality of saw wires.

In a method for cutting a workpiece with a wire saw according to an embodiment of the present invention, the supply of the first abrasive grain slurry is performed by spraying from a nozzle.

In a method for cutting a workpiece with a wire saw according to an embodiment of the present invention, the two points on the saw wire where the first abrasive grain slurry is supplied are changed as the cutting of the workpiece progresses.

In a method for cutting a workpiece with a wire saw according to an embodiment of the present invention, a temperature of the first abrasive grain slurry and a temperature of the second abrasive grain slurry are controlled.

With a method for cutting a workpiece with a wire saw according to an embodiment of the present invention, regardless of the length of the meshing area of the saw wire, abrasive grain slurry can sufficiently be supplied evenly across the whole meshing area of the saw wire, the development of unnecessary stress and heat in the cutting part within the workpiece during cutting can be prevented, and the generation of vibrations during cutting can also be prevented. Therefore, even workpieces with a large diameter can be cut precisely, further, breakage of the cut portions can be prevented, and a highly reliable processing performance can be realized.

Figure 1:
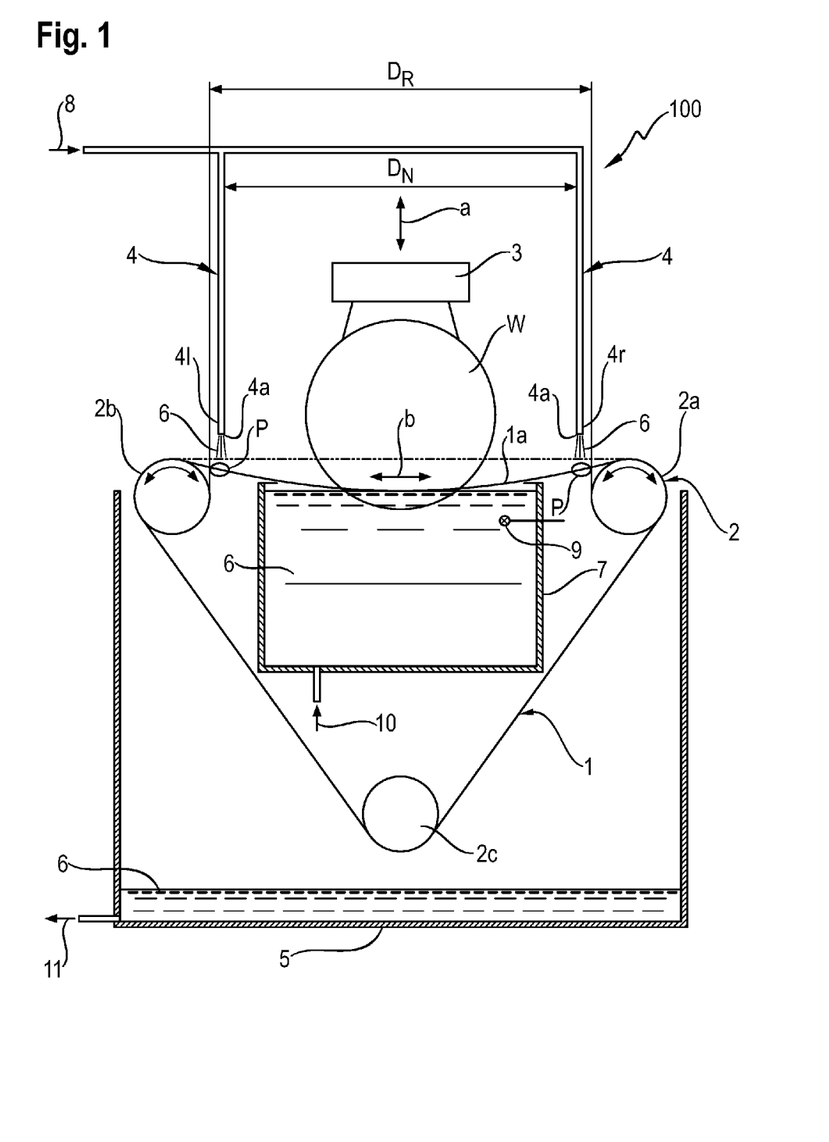
FIG. 1 is a drawing showing a cutting device implementing a method for cutting a workpiece with a wire saw according to an embodiment of the present invention.

FIG. 1 shows a cutting device carrying out a method for cutting a workpiece with a wire saw according to an embodiment of the present invention.

As shown in FIG. 1, the cutting device 100 has three rollers 2, a saw wire 1 wound around these three rollers 2, and a workpiece holding device 3 that holds the workpiece W and moves, thereby transporting the workpiece W to a predetermined position in order to cut the workpiece W with the saw wire 1. Of the rollers 2, the two rollers 2a, 2b are arranged on top while the single roller 2c is arranged below, and the two upper rollers 2a, 2b are arranged at the same height in vertical direction (direction of arrow a) and a predetermined distance DR apart in horizontal direction (direction of arrow b), while the lower roller 2c is arranged below the upper rollers 2a, 2b, e.g., at a middle position between the upper rollers 2a, 2b. At least one of the rollers 2 can be rotated both ways in left-right-direction by a driving device not shown in the drawings. Therefore, the saw wire 1 can run between the two upper rollers 2a, 2b both ways in left-right-direction as shown by arrow b. The workpiece holding device 3 can be moved in vertical direction (direction of arrow a) above the upper rollers 2a, 2b.

Figure 2:
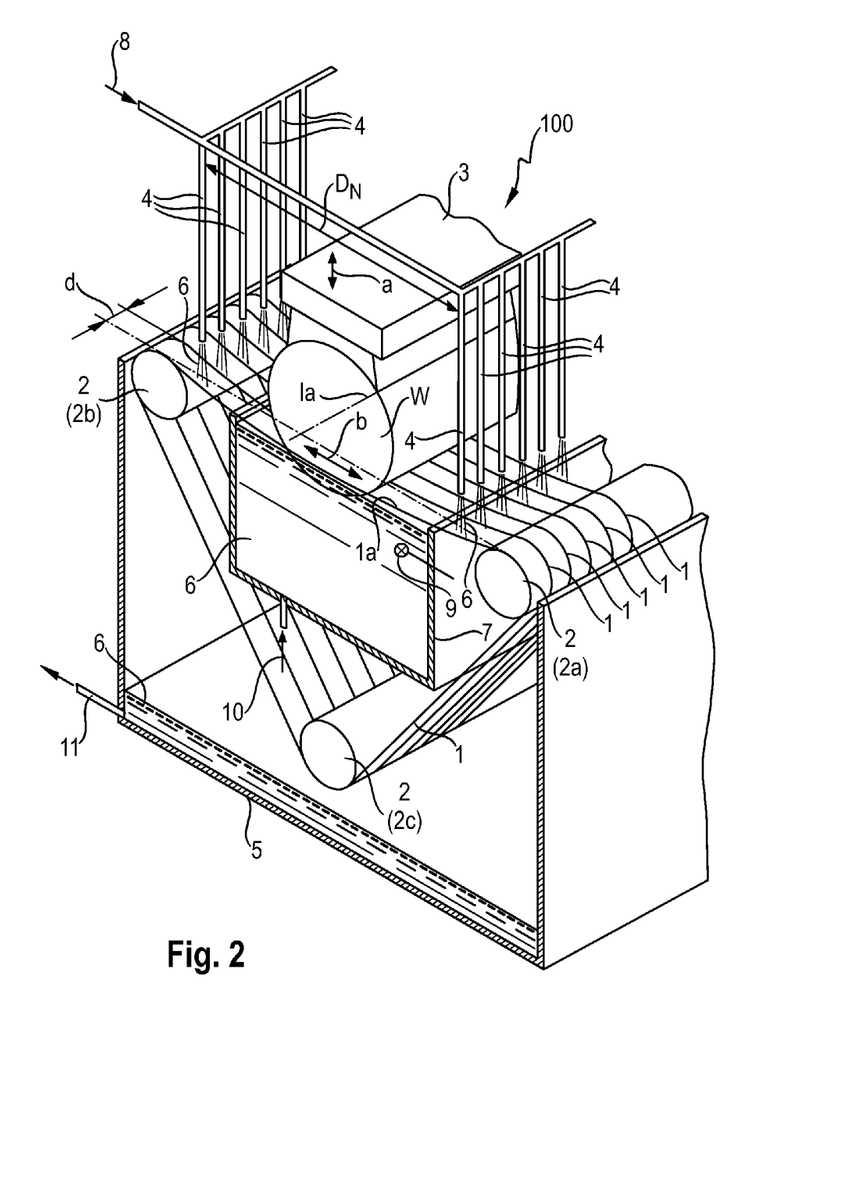
FIG. 2 is a perspective view of the cutting device of FIG. 1.

As shown in FIG. 2, the rollers 2 stretch for about as far as the workpiece W in the direction of the axis line 1a of the workpiece W. The length of the rollers 2 in the direction of the axis line 1a may also be shorter or longer than the length of the workpiece W in the direction of the axis line 1a. Furthermore, the cutting device 100 possesses a plurality of saw wires 1 that are arranged in the direction of the axis line 1a with a predetermined distance d from each other in the direction of the axis line 1a and in parallel to each other. The predetermined distance d between neighboring saw wires 1 corresponds to the thickness of the wafers which are formed by the workpiece W being cut. Furthermore, the number of saw wires 1 corresponds to the length of the workpiece W, i.e. to the number of wafers obtained from the workpiece W.

The cutting device 100 further has a first abrasive grain slurry tank 5 and a second abrasive grain slurry tank 7. The first abrasive grain slurry tank 5 is provided in order to accumulate or discharge the abrasive grain slurry 6, while the second abrasive grain slurry tank 7 is provided to be filled with the abrasive grain slurry 6. The first abrasive grain slurry tank 5 has a larger size than the second abrasive grain slurry tank 7 and is arranged so that the rollers 2 are accommodated inside it. The second abrasive grain slurry tank 7 is arranged inside the first abrasive grain slurry tank 5 below the stretching portion 1a of the saw wire 1 that stretches between the two upper rollers 2a, 2b, and above the lower roller 2c, stretches in the direction of the axis line 1a, and is formed with a size enabling the workpiece W to be accommodated inside it. An abrasive grain slurry discharge pipe 11 for discharging the abrasive grain slurry 6 that has accumulated inside the first abrasive grain slurry tank 5 is connected to the lower part of the first abrasive grain slurry tank 5. The abrasive grain slurry discharge pipe 11 is connected to a circulation pipeline which is not shown in the drawings. To this circulating pipeline, a cleaning device that cleans the abrasive grain slurry containing cutting dust from the workpiece may be attached. The abrasive grain slurry discharge pipe 11 does not have to be connected to the circulating pipeline. In such a case, the abrasive grain slurry 6 may also be disposed via the abrasive grain slurry discharge pipe 11. Furthermore, an abrasive grain slurry supply pipe 10 is connected to the lower part of the second abrasive grain slurry tank 7. The abrasive grain slurry supply pipe 10 is connected to an abrasive grain slurry supply device that is not shown in the drawings. As grains, the abrasive grain slurry 6 comprises, e.g., finely grained SiC.

Furthermore, the cutting device 100 has a plurality of nozzle pairs 4 that include right nozzles 4r and left nozzles 4l and supply the abrasive grain slurry 6 to the stretching portion 1a of the saw wires 1. Here, the right side of FIG. 1 is right and the left side of FIG. 1 is left. The plurality of pairs of nozzles 4 are arranged in the direction of the axis line 1a corresponding to the saw wires 1 in parallel with the distance d. In other words, corresponding to one saw wire 1, one pair of nozzles 4 are provided, and the pair of nozzles 4 are arranged above the corresponding saw wire 1 with the openings 4a facing the saw wire 1. Each pair of nozzles 4 are connected to an abrasive grain slurry supply pipe 8, and in each of the pairs of nozzles 4, the nozzles 4r, 4l are arranged above the stretching portion 1a of the saw wire 1 with a predetermined distance DN in horizontal direction. As described below, this predetermined distance DN is the distance from which, in the cutting process, the abrasive grain slurry 6 is sprayed onto the two supply portions P (two points with a predetermined distance) that are portions of the saw wire 1 outside from the portions of the saw wire 1 where it meshes with the workpiece W, and that are portions above the abrasive grain slurry surface of the abrasive grain slurry 6 inside the second abrasive grain slurry tank 7. The nozzles 4 can spray the abrasive grain slurry 6 that is supplied via the abrasive grain slurry supply pipe 8, onto the stretching portion 1a of the saw wire 1.

Furthermore, the cutting device 100 has a temperature sensor 9 that is attached inside the second abrasive grain slurry tank 7. The temperature sensor 9 detects the temperature of the abrasive grain slurry 6 inside the second abrasive grain slurry tank 7, and based on the detected temperature of the abrasive grain slurry 6, a temperature controller which is not shown in the drawings adjusts the temperature of the abrasive grain slurry 6 that is supplied to the second abrasive grain slurry tank 7 to a desired temperature.

In the cutting device 100, the workpiece W and the saw wires 1 are moved relative to each other and brought into contact in the manner described below during the cutting operation of the workpiece W. In a cutting operation of the workpiece according to an embodiment of the present embodiment, the saw wires 1 move upward (to the workpiece side) in the direction of the arrow a in FIGS. 1 and 2, while the workpiece holding device 3 moves the workpiece W downward (to the saw wire side) in the direction of the arrow a, so that the workpiece W is brought into contact with the saw wires 1. In order to make the saw wires 1 moveable, the rollers 2 around which the saw wires 1 are wound are configured so that they can be vertically (in the direction of the arrow a) moved by a driving device.

Furthermore, during the cutting of the workpiece W, the workpiece holding device 3 moves in vertical direction and the rollers 2 move in vertical direction so that the saw wires 1 move in vertical direction. Because of this, the position of the workpiece W in relation to the surface of the abrasive grain slurry 6 that has accumulated inside the second abrasive grain slurry tank 7 is adjusted so that it becomes as follows.

In the present embodiment, all saw wires 1 are wound around the three rollers 2a, 2b, 2c as shown in FIG. 2. However, the aspect of the rollers 2 is not limited to this. For example, a mode may be employed wherein three rollers 2a, 2b, 2c are arranged for each of the saw wires 1.

Furthermore, while in the present embodiment, each pair of the plurality of pairs of nozzles 4 is arranged above each of the saw wires 1 so that each pair of the nozzles 4 correspond to each saw wire 1, the aspect of the nozzles 4 is not limited to this. For example, a pair of nozzles 4 may be arranged below, diagonally above or below, or beside a saw wire 1. In other words, the openings 4a of the nozzles 4r, 4l may be arranged below, diagonally above or below, or beside with respect to the saw wire 1. The cutting device 100 may further possess only one pair of nozzles 4. In such a case, the abrasive grain slurry 6 will be sprayed onto the two supply portions P of all saw wires 1 from one nozzle 4r, 4l, respectively. Furthermore, while the cutting device 100 possesses a plurality of pairs of nozzles 4, the number of pairs of nozzles 4 may also be smaller than the number of saw wires 1. In such a case, the abrasive grain slurry 6 is supplied from each pair of nozzles 4 to a predetermined group (number) of saw wires 1. In addition, in the pair of nozzles 4, the nozzles 4r, 4l may be configured in a way that the distance DN between the nozzles 4r, 4l is variable. In such a case, the nozzles 4r, 4l are moved in a direction where the nozzles 4r, 4l approach each other or in a direction where the nozzles 4r, 4l distance themselves from each other by, e.g., a driving device.

Furthermore, in the present embodiment, only one abrasive grain slurry supply pipe 8 is provided for the plurality of pairs of nozzles 4. However, multiple abrasive grain slurry supply pipes 8 may be provided. For example, there may be a plurality of abrasive grain slurry supply pipes 8 and each abrasive grain slurry supply pipe 8 may be connected to one pair of nozzles 4, or one abrasive grain slurry supply pipe 8 may be connected to a plurality of pairs of nozzles 4.

Furthermore, although during the cutting operation of the workpiece W in the present embodiment, the workpiece holding device 3 and the saw wires 1 move relative to each other and the workpiece W is brought into contact with the saw wires 1, the relative movement of the workpiece W and the saw wires 1 may also be realized in a different manner. For example, it is possible that during the cutting of the workpiece W, only either the saw wires 1 or the workpiece holding device 3 move.

Furthermore, in the present embodiment, the second abrasive grain slurry tank 7 may be moved in vertical direction (in the direction of the arrow a in FIGS. 1 and 2) by a driving device not shown in the drawings, and the position of the surface of the abrasive grain slurry 6 that has accumulated inside the second abrasive grain slurry tank 7 may be adjusted to become as described below.

Hereinafter, a method for cutting a workpiece with a wire saw according to an embodiment of the present invention, which is realized by the cutting device 100 possessing the above configuration, is described.

First, the abrasive grain slurry 6 is supplied from the abrasive grain slurry supply device, via the abrasive grain slurry supply pipe 10 to the second abrasive grain slurry tank 7, and the second abrasive grain slurry tank 7 is filled with the abrasive grain slurry 6. Here, the abrasive grain slurry 6 is supplied to the second abrasive grain slurry tank 7 so that the abrasive grain slurry surface reaches a predetermined height inside the second abrasive grain slurry tank 7. Subsequently, the rollers 2 are driven, thereby setting the saw wires 1 in motion, the abrasive grain slurry 6 is provided from the abrasive grain slurry supply device via the abrasive grain slurry supply pipe 8 to the pairs of nozzles 4, and the abrasive grain slurry 6 is sprayed from all nozzles 4r, 4l onto the supply portions of the stretching portions 1a of the saw wires 1 that run left and right to and fro. Thereafter, the workpiece W is held by the workpiece holding device 3 and transported to a predetermined location above the stretching portions 1a of the saw wires 1. The workpiece W is, e.g., a silicon ingot made of silicon single crystals. The above sequence of the supply of the abrasive grain slurry 6, the driving of the rollers 2 and the transporting of the workpiece W is one possible example. However, the sequence of these operations is not limited to the above sequence; other sequences may be used as well.

Subsequently, the saw wirer 1 and the workpiece holding device 3 are moved relative to each other in vertical direction (direction of arrow a in FIGS. 1 and 2) so that they come closer to each other, and the workpiece W is pushed against the saw wires 1 from above in the stretching portions 1a. The abrasive grain slurry 6 is supplied from nozzles 4r, 4l to each saw wire 1 in the supply portions P to the left and to the right of the workpiece W, and the abrasive grain slurry 6 is also supplied to the parts of the saw wires 1 that are in contact with the workpiece W. Therefore, grinding due to the abrasive grains starts between the saw wires 1 and the workpiece W, and the cutting is started. At this point, the saw wires 1 bend down convexly as shown in FIG. 1.

Figure 3:
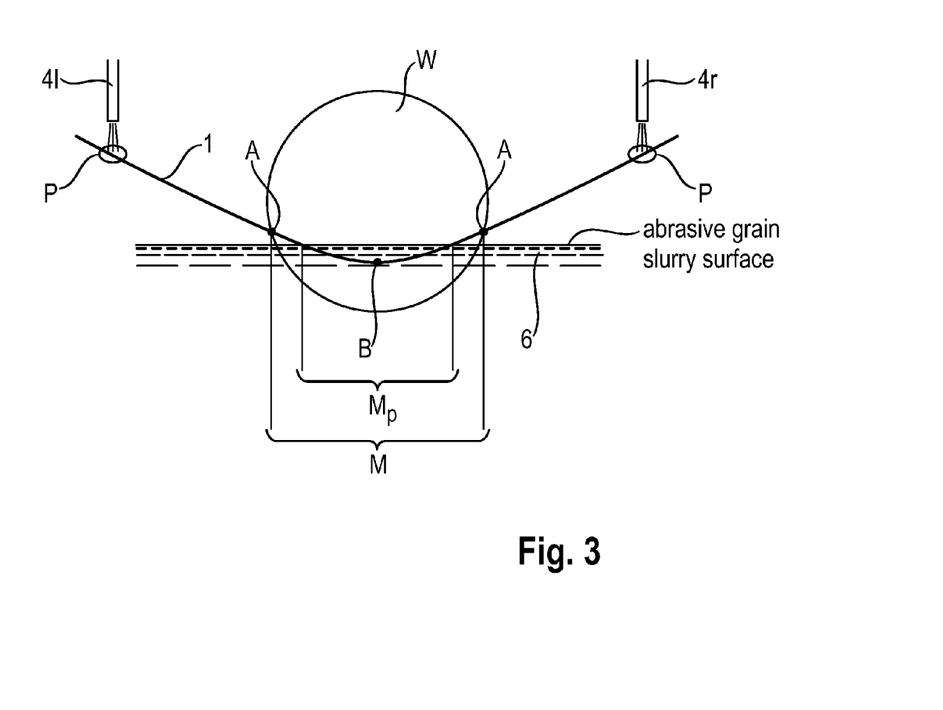
FIG. 3 is a partial, enlarged view of the cutting device of FIG. 1.

Until a predetermined width of the workpiece W in horizontal direction is cut, i.e. until the length of the meshing areas M (see FIG. 3) of the workpiece W with the saw wires 1 reach a predetermined length, the supply of the abrasive grain slurry 6 to the meshing areas M is carried out only by the pairs of nozzles 4. Subsequently, when the length of the meshing areas M reaches the predetermined length, one part Mp of the meshing areas M is immersed into the abrasive grain slurry 6 inside the second abrasive grain slurry tank 7 as shown in FIG. 3. In other words, the part Mp of the meshing area is immersed below the surface of the abrasive grain slurry 6 inside the second abrasive grain slurry tank 7. The supply portions P of the saw wires 1 onto which the abrasive grain slurry 6 is supplied from the nozzles 4r, 4l, are located so that they lie on the outside from the meshing areas M and above the abrasive grain slurry surface.

The following cutting operation is performed until the workpiece W is entirely cut, while maintaining the above-described positional relationships. That is, the cutting is performed while the following positional relationships are maintained. During the cutting of the workpiece, the saw wires 1 are located above the surface of the abrasive grain slurry 6 at the entry/exit points A that are the two ends of the meshing area M, and the saw wires 1 are not immersed into the abrasive grain slurry 6 at the entry/exit points A, as shown in FIG. 3. Furthermore, the saw wires 1 and the workpiece W are immersed into the abrasive grain slurry 6 so that the surface of the abrasive grain slurry 6 is located between the entry/exit points A of the saw wires and the maximum bending points B where the saw wires have moved most in the direction in which the saw wires 1 are pushed against the workpiece. Moreover, each nozzle 4r, 4l is positioned so that the sprayed-on points P to which the abrasive grain slurry 6 is supplied, are located outside from the entry/exit points A of the saw wires 1.

During the cutting of the workpiece W, the saw wires 1 and the workpiece holding device 3 are driven in vertical direction so that the above-described positional relationships are maintained. Furthermore, the second abrasive grain slurry tank 7 may be configured so that it also is driven in vertical direction at this time. Also, the mode for enabling that these positional relationships are maintained during cutting may also be a different mode. For example, it is possible to only move either the saw wire 1 or the workpiece holding device 3 and to move the second abrasive grain slurry tank 7 in vertical direction. It is also possible to only move the workpiece holding device 3. In such a case, the saw wires 1, the driving rollers 2 and the second abrasive grain slurry tank 7, etc. are fixed at locations that make it possible to achieve the above positional relationships.

Furthermore, the nozzles 4r, 4l may also not be fixed but configured to be moveable. It is also possible to configure the predetermined distance DN between two nozzles 4r, 4l to be variable depending on the width of the meshing areas M that changes along with the progress of the cutting. Concretely, the nozzles 4r, 4l may be moved in horizontal direction so that the locations between the points (supply locations P) on the saw wires 1 to which the abrasive grain slurry 6 is supplied from the nozzles 4r, 4l, and the entry/exit points A are constant or lie within a predetermined range.

In the above cutting operation, no great amount of the abrasive grain slurry 6 is supplied between the workpiece W and the saw wire 1 at the beginning of the cutting of the workpiece W, and the appropriate amount of the abrasive grain slurry 6 is supplied, so that defects such as the saw wire 1 vibrating on the surface of the workpiece W, can be prevented and the cutting can be started well. Furthermore, even after the beginning of the cutting, the appropriate amount of the abrasive grain slurry 6 can be supplied to the meshing areas M, so that it is possible to enable good cutting.

The abrasive grain slurry 6 discharged from the cut surface of the workpiece W dribbles as it is into the first abrasive grain slurry tank 5 attached below the workpiece W, and is stored there. In the stored abrasive grain slurry 6, cutting dust (Si) from the workpiece W exists beside the abrasive grains. This abrasive grain slurry 6 is discharged via the abrasive grain slurry discharge pipe 11, cleaned by the cutting dust being separated by a cleaning device in the circulation pipeline not shown in the drawings, and returned to the slurry supply device. Furthermore, this abrasive grain slurry 6 may also be disposed of via the abrasive grain slurry discharge pipe 11.

By repeatedly performing the above-described cutting operation, the silicon ingot can be sliced and wafers can be formed.

In the above cutting operation, the temperature sensor 9 detects the temperature of the abrasive grain slurry 6 inside the second abrasive grain slurry tank 7, and based on the detected temperature of the abrasive grain slurry 6, a temperature controller which is not shown in the drawings may adjust the temperature of the abrasive grain slurry 6 that is supplied to the second abrasive grain slurry tank 7 to a desired temperature. In doing so, good cutting becomes possible.

EXAMPLES

Hereinafter, an example of the present invention is described.

The method for cutting a workpiece with a wire saw according to the embodiment of the present invention was carried out using the cutting device 100, and the silicon ingot being the workpiece W was cut and wafers were produced under the following conditions (Example 1).

Cutting conditions:
Diameter of silicon wafer: 450 mm
Thickness of silicon wafer: 840 μm
Number of slices: 280
Speed of saw wire: 500 mm/min
Saw wire tension: 2.5 kgf
Wire diameter of saw wire: 0.14 mm
Abrasive grains: GC #1500 (SiC)
Slurry: water-soluble coolant
Cutting duration: 8 hours
Abrasive grain slurry supply amount (abrasive grain slurry supply pipe 8): 80 liters/minute Abrasive grain slurry supply amount (abrasive grain slurry supply pipe 10): 80 liters/minute Abrasive grain slurry temperature: controlled to 25° C.±0.5° C.

Figure 4:
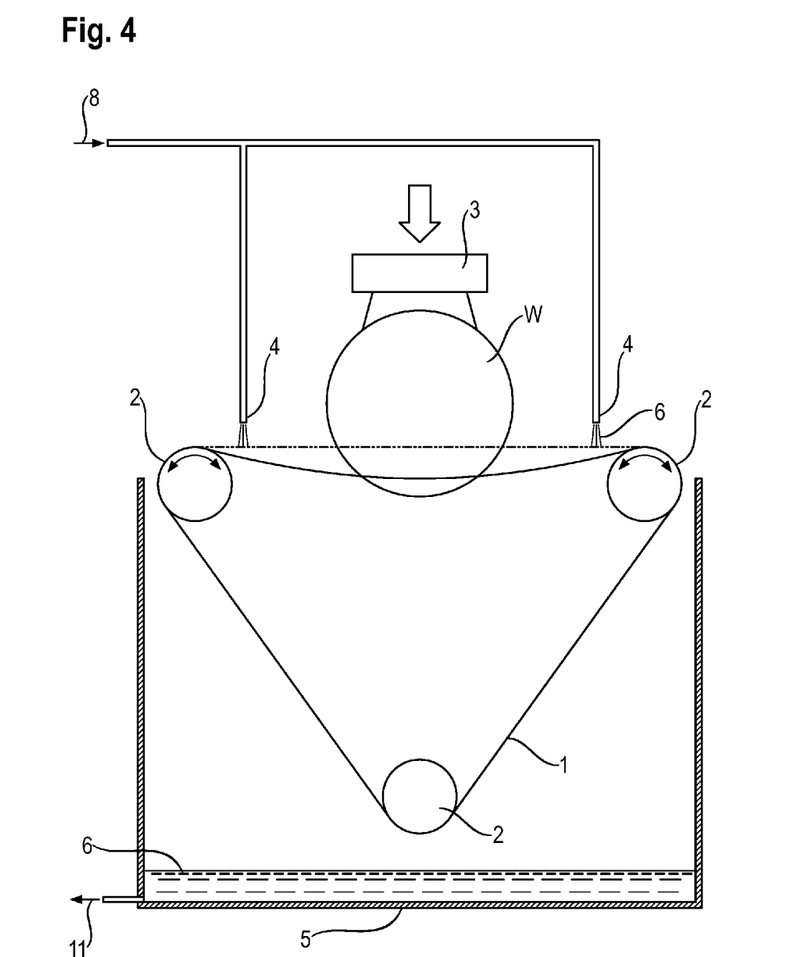
FIG. 4 is a drawing showing a cutting device implementing a method for cutting a workpiece with a wire saw according to Comparative Example 1.

Under these cutting conditions, the silicon ingot acting as workpiece W was cut and wafers were produced using a comparative cutting method shown in FIG. 4 (Comparative Example 1).

Unlike in Example 1, in Comparative Example 1, the abrasive grain slurry 6 was supplied to the saw wires 1 only from the pairs of nozzles 4, and the meshing areas M were not immersed into the abrasive grain slurry.

Figure 5:
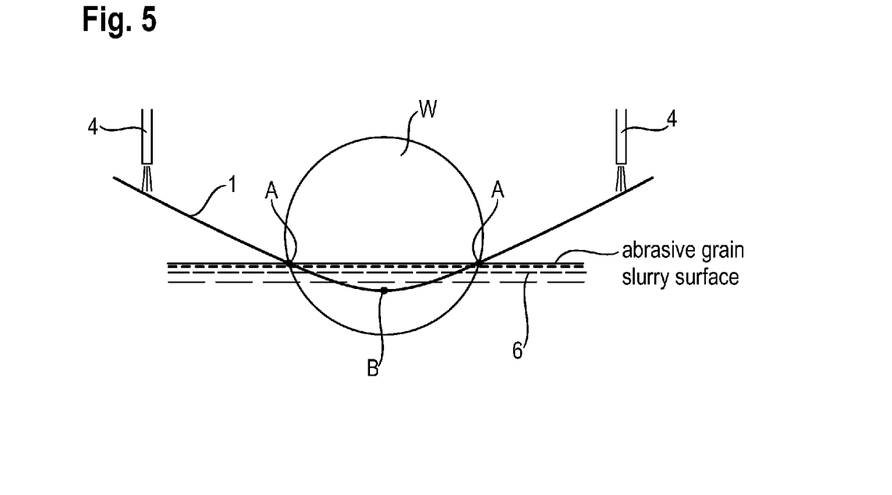
FIG. 5 is a drawing showing a cutting device implementing a method for cutting a workpiece with a wire saw according to Comparative Example 2.
Figure 6:
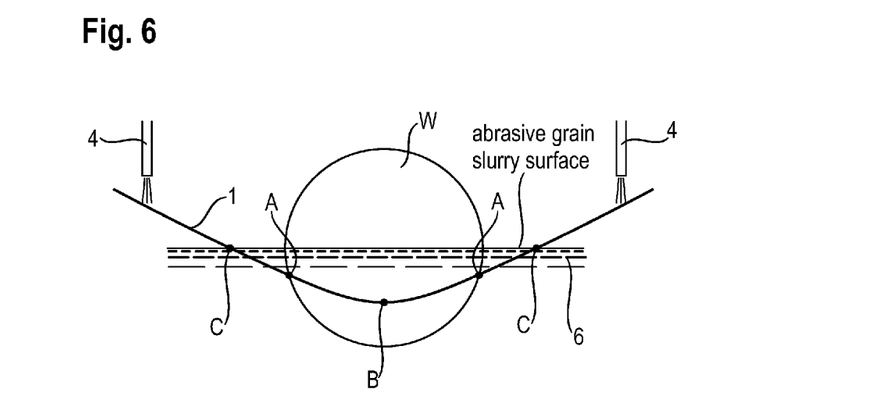
FIG. 6 is a drawing showing a cutting device implementing a method for cutting a workpiece with a wire saw according to Comparative Example 3.

Furthermore, under the above cutting conditions, the silicon ingot acting as workpiece W was cut and wafers were produced using the cutting method shown in FIGS. 5 and 6 (Comparative Examples 2, 3).

Comparative Example 2 differs from Example 1 in that, as shown in FIG. 5, the saw wires 1 and the workpiece W were immersed into the abrasive grain slurry 6 so that the entry/exit points A of the saw wires 1 coincided with the surface of the abrasive grain slurry 6 inside the second abrasive grain slurry tank 7.

Comparative Example 3 differs from Example 1 in that, as shown in FIG. 6, the workpiece W was immersed into the abrasive grain slurry 6 so that the entry/exit points A of the saw wires 1 also sank below the surface of the abrasive grain slurry 6 inside the second abrasive grain slurry tank 7. In short, the saw wires 1 touched the surface of the abrasive grain slurry 6 in a point C that was located at a predefined distance outside from the entry/exit points A and the saw wires 1 were not immersed into the abrasive grain slurry 6 outside from this point C.

Figure 7:
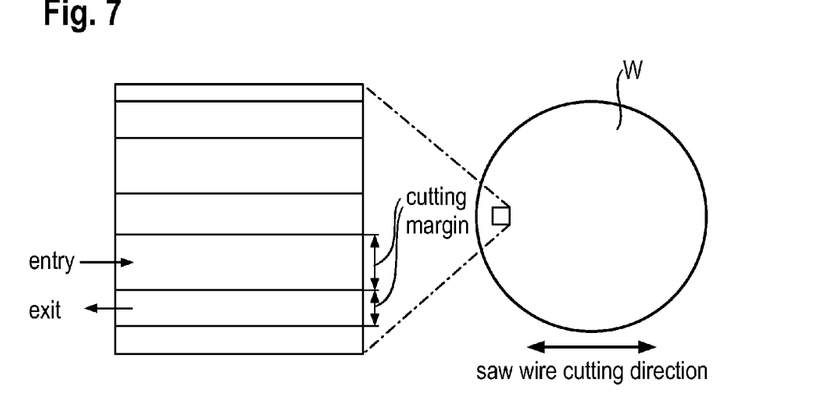
FIG. 7 is a drawing showing an appearance of a cut surface of a workpiece cut with Example 1.

The cut surfaces of the wafers cut in Example 1 and in Comparative Examples 1 to 3 were observed with a laser scanning microscope. In Comparative Examples 1 to 3, the cutting margin on the saw wire exit side was much smaller than the cutting margin on the saw wire entry side, as shown in FIG. 8. In Example 1, on the other hand, the cutting margins on the entry side and on the exit side of the saw wire 1 were almost equal, as shown in FIG. 7. Incidentally, FIGS. 7 and 8 are drawings showing enlarged cut surfaces of the left hand side part of the workpiece in the direction of the cutting run of the saw wires.

Furthermore, the cutting speed in Example 1 and in Comparative Examples 1 to 3 was measured, the cut surfaces of Example 1 and of Comparative Examples 1 to 3 were observed with a laser scanning microscope, and the "cracks", "warps", "TTV (total thickness variation)" and "nano topology" of the cut surfaces were evaluated. The results of these measurements and these evaluations of the cut surfaces are shown below in Table 1.

TABLE 1

| | | Cut surface quality | | | |
|---|---|---|---|---|---|
| | Cutting speed mm/hr | Cracks % | Warps μm | TTV μm | Nano topology nm |
| Comparative Example 1 | 25 | 0.1 | 20 | 15 | 30 |
| Comparative Example 2 | ◎ | ○ | — | — | — |
| Comparative Example 3 | ◎ | — | ○ | — | — |
| Example 1 | ◎ | ○ | ◎ | ○ | ○ |

In the evaluation of Table 1, ◎ shows an improvement of 40% or more compared to Comparative Example 1, ○ shows an improvement of 20% to 40% compared to Comparative Example 1, and – shows a level similar to that of Comparative Example 1.

As can be understood based on Table 1, the cutting speed in Example 1 is at least 40% higher compared to Comparative Example 1, and the processing efficiency has increased. Furthermore, the cut surface in Example 1 has a better quality than the cut surfaces in Comparative Examples 1 to 3. In other words, in Example 1, regardless of the length of the meshing area of the saw wire 1, i.e. regardless of the diameter size of the workpiece W, the abrasive grain slurry 6 can be supplied sufficiently and evenly across the whole meshing area of the saw wire 1, the development of unnecessary stress and heat in the cutting part within the workpiece W during cutting can be prevented, and the generation of vibrations during cutting can also be prevented. Therefore, obviously, even workpieces W with a large diameter can be cut precisely, further, breakage of the cut portions can be prevented, and a highly reliable processing performance can be realized.

Thus, with the present invention, the quality of the cut surfaces of the cut wafers can be improved and cutting speed can be increased, even in cases where a workpiece W with a large diameter is cut. Furthermore, workpieces W can be cut precisely, breakage of the cut portions can be prevented, and a highly reliable processing performance can be realized.

While the invention has been particularly shown and described with reference to preferred embodiments thereof, it will be understood by those skilled in the art that various changes in form and details may be made therein without departing from the spirit and scope of the invention.

LIST OF REFERENCE NUMERALS

1 Saw wire
2 Roller
3 Workpiece holding device
4 Nozzle
5 First abrasive grain slurry tank
6 Abrasive grain slurry
7 Second abrasive grain slurry tank
8 Abrasive grain slurry supply pipe
9 Temperature sensor
10 Abrasive grain slurry supply pipe
11 Abrasive grain slurry discharge pipe
M Meshing area
W Workpiece

What is claimed is:

1. A method for cutting a workpiece with a wire saw, the method comprising:
running at least one saw wire in a lateral direction;
supplying an abrasive grain slurry to the at least one saw wire on two points that are separated by a predetermined distance in a lateral direction;
starting cutting of the workpiece by moving at least one of the workpiece and the at least one saw wire relative to the other and bringing the workpiece into contact with the at least one saw wire from above at a location between the two points on the at least one saw wire where the abrasive grain slurry is supplied creating an initial point of workpiece contact, an engaged meshing length where the at least one saw wire meshes with the workpiece, and an endpoint of workpiece contact, where the initial point of workpiece contact and the endpoint of workpiece contact are ends of the engaged meshing length; and
performing cutting of the workpiece by immersing the workpiece into a tank filled with the abrasive grain slurry, wherein, a part of the at least one saw wire within the engaged meshing length is maintained submerged below a top surface of the abrasive grain slurry and the at least one saw wire at both the initial point of workpiece contact and the endpoint of workpiece contact is maintained above the top surface of the abrasive grain slurry.

2. The method recited in claim 1, wherein the two points on the at least one saw wire where the abrasive grain slurry is supplied are disposed above a surface of the abrasive grain slurry stored in the tank.

3. The method recited in claim 1, wherein the at least one saw wire includes a plurality of saw wires disposed in parallel with each and having a predetermined distance therebetween.

4. The method recited in claim 3, wherein the abrasive grain slurry is supplied from one supply source to a first of the two points on the plurality of saw wires, and the abrasive grain slurry is supplied from another supply source to a second of the two points on the plurality of saw wires.

5. The method recited in claim 3, wherein the abrasive grain slurry is supplied from one supply source to a first of the two points on each of the plurality of saw wires, and the abrasive grain slurry is supplied from another supply source to a second of the two points on each of the plurality of saw wires.

6. The method recited in claim 1, wherein the supplying the abrasive grain slurry includes spraying the abrasive grain slurry from a nozzle.

7. The method recited in claim 1, wherein the two points on the saw wire where the abrasive grain slurry is supplied are changed as cutting of the workpiece progresses.

8. The method recited in claim 1, further comprising controlling the temperature of the abrasive grain slurry supplied to the at least one saw wire and the abrasive grain slurry filled in the abrasive grain slurry tank.

* * * * *